(12) United States Patent
Conley et al.

(10) Patent No.: US 6,701,586 B2
(45) Date of Patent: Mar. 9, 2004

(54) SHEET GRIPPING ASSEMBLY

(75) Inventors: Thomas L. Conley, Chino, CA (US); Howard L. Davis, Ontario, CA (US)

(73) Assignee: John L. Conley, Inc., Montclair, CA (US)

( * ) Notice: Subject to any disclaimer, the term of this patent is extended or adjusted under 35 U.S.C. 154(b) by 0 days.

(21) Appl. No.: 10/209,443

(22) Filed: Jul. 30, 2002

(65) Prior Publication Data

US 2004/0020019 A1 Feb. 5, 2004

(51) Int. Cl.$^7$ .......................... A44B 21/00; A47H 13/00
(52) U.S. Cl. .............. 24/460; 24/522; 24/464; 24/486; 24/462; 160/346; 160/392
(58) Field of Search .................... 24/460, 464, 462, 24/486, 488, 522; 52/222; 211/50, 89; 160/392, 395, 346, 378

(56) References Cited

U.S. PATENT DOCUMENTS

| | | | | |
|---|---|---|---|---|
| ,783,759 A | * | 2/1905 | Record | 24/460 |
| 1,013,531 A | * | 1/1912 | Carmany | 160/392 |
| 2,104,473 A | * | 1/1938 | Watson | 160/346 |
| 4,057,095 A | * | 11/1977 | Hirota | 160/392 |
| 4,103,401 A | | 8/1978 | Conley | |
| 4,144,622 A | * | 3/1979 | Yoshinari | 160/392 |
| 4,231,141 A | * | 11/1980 | Derrick et al. | 24/460 |
| 4,532,744 A | | 8/1985 | Beneze et al. | |
| 4,799,299 A | * | 1/1989 | Campbell | 24/462 |
| 4,847,958 A | * | 7/1989 | Conley | 24/462 |

* cited by examiner

Primary Examiner—Victor Sakran
(74) Attorney, Agent, or Firm—Boniard I. Brown

(57) ABSTRACT

A sheet gripping assembly comprises an elongate member having a side defining inwardly extending wall portions defining confronting channels, and a gripping member of generally zigzag configuration manually manipulable to engage into said confronting channels to secure sheet material between the elongate members and the gripping member. The elongate member may have an elongated slot for positioning therealong a threaded fastener to secure the elongate member to a second structural member.

13 Claims, 3 Drawing Sheets

SHEET GRIPPING ASSEMBLY

BACKGROUND AND SUMMARY OF THE INVENTION

The present invention relates to gripping assemblies for securement of sheet material, such as plastic sheeting, on structural components wherein the sheet material is secured in channel portions of structural components or members.

The sheet material is secured in the channel in structural members by a gripper member against disengagement of the sheet by forces tending to disengage the material.

The present invention is herein described in relation to its utilization in greenhouse structures, typically involving a structure comprising structural members, pipes, etc., certain of which may be generally vertical and other components disposed at horizontal or inclined orientation. In greenhouse structures and the like, sheet material may typically be transparent for transmission of sunlight and daylight for plant culture, and the sheet material may typically extend between structural components to provide weather and wind shielding while providing for admission of sunlight and daylight.

It is necessary that disengagement of sheet material be prevented to the extent possible. Forces tending to disengage the sheet material typically include wind forces, thermal expansion of the sheet material which reduces tension stress in the material and tends to dislodge it, air pockets between gripping components, and thermal expansion of air pockets.

The present invention provides sheet material gripping assemblies comprising a gripping member inserted into opposed channel portions of an elongate structural member to secure the sheet material. The gripping member is of generally zigzag configuration and is adapted to engage in opposite channels defined in the elongate member. The gripping member is sufficiently resilient to enable manual deformation thereof in the process of engaging successive zigzag portions of the gripping member in the oppositely facing channels of the elongate member.

The gripping member is deformed along successive lengths thereof during the manual insertion process, as indicated in FIG. 4 of the drawings, thus to engage successive zigzag portions thereof into the opposing channels. The spring clamping forces between the gripping member and the opposed channels resist and prevent disengagement of the sheet material from the structural member.

DESCRIPTION OF THE PREFERRED EMBODIMENT

Figure 1:
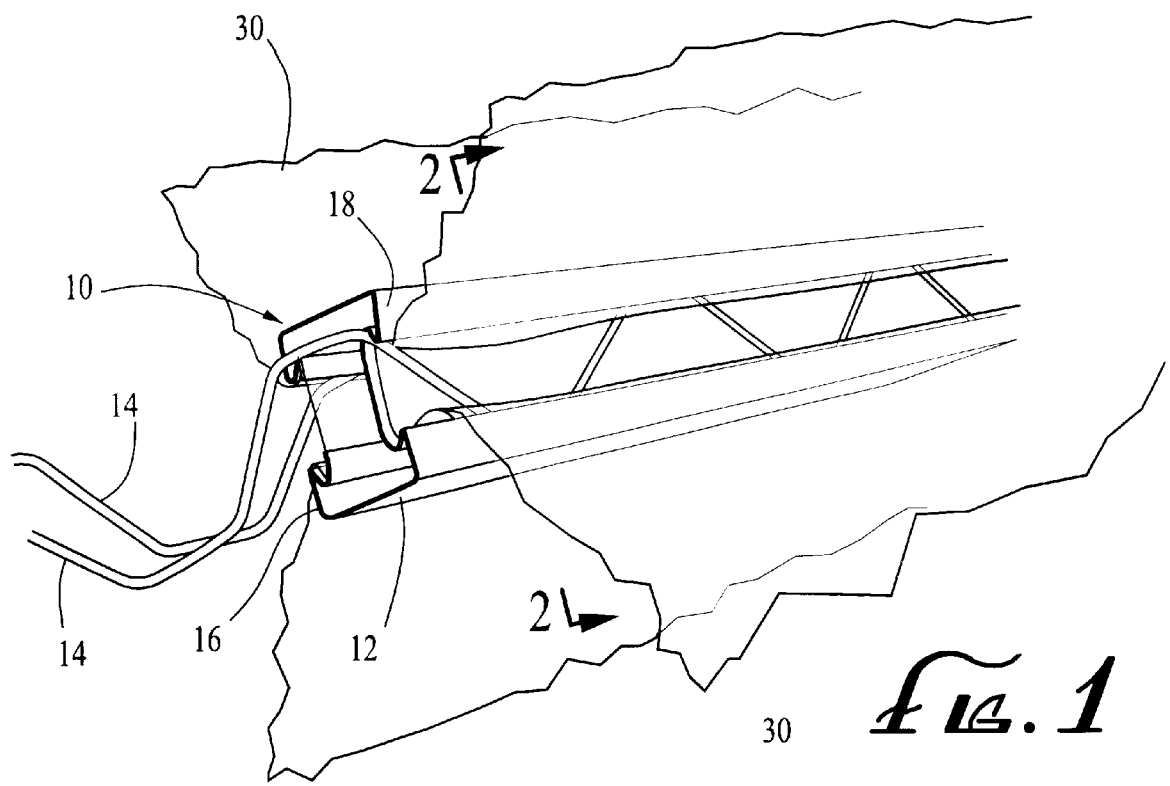
FIG. 1 is a perspective view of a gripping assembly of the present invention in relation to sheet material secured in a structural member.
Figure 2:
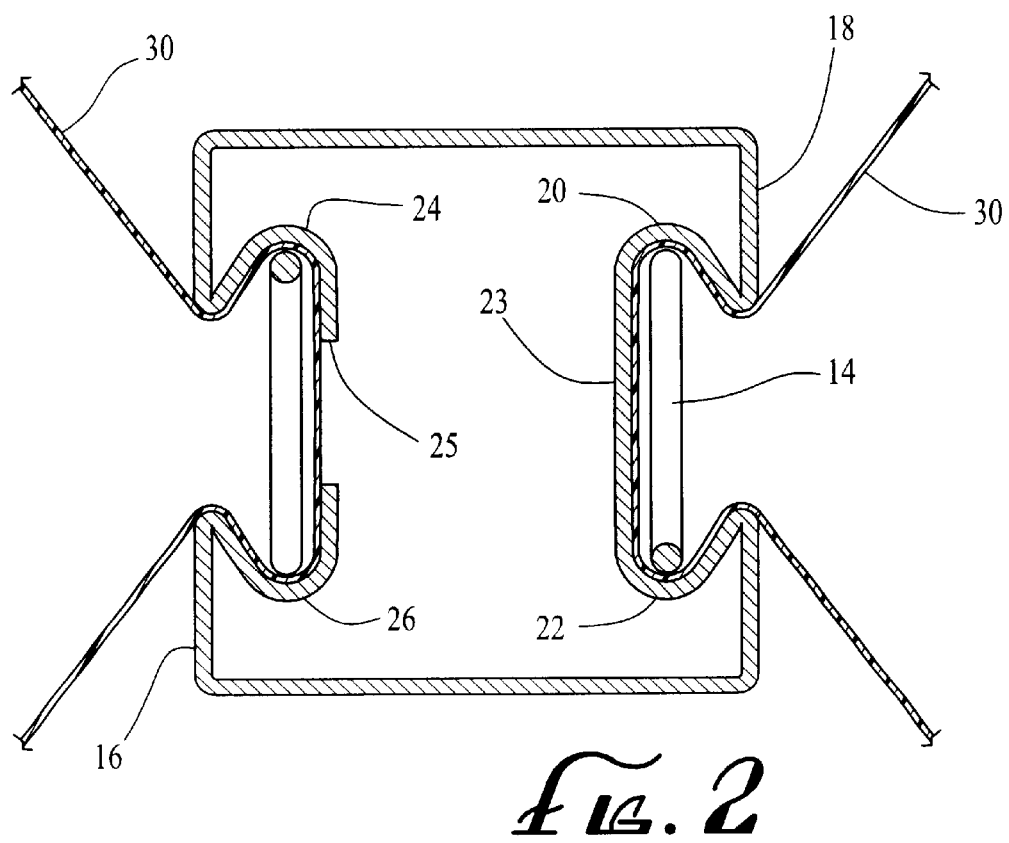
FIG. 2 is a sectional view taken at line 2—2 in FIG. 1, showing sheet material secured in channel portions of a structural member by a gripping assembly of the invention.

Referring to the drawings, a preferred embodiment of the invention comprises a sheet gripping assembly 10 comprising an elongate structural member 12 having opposite sides 16, 18 and a gripping member 14 of generally zigzag configuration for securing sheet material 30 in the elongate member. Each side of the elongate member is configured to define inwardly and oppositely inclined wall portions, as shown, these being wall portions 20, 22 of side 18, and inclined wall portions 24, 26 of side 16.

Wall portions 20, 22 on side 18 of the elongate member 12 are joined by a web 23, as shown. The wall portions 24, 26 define therebetween an elongate slot 25 extending along elongate member 12.

Figure 6B:
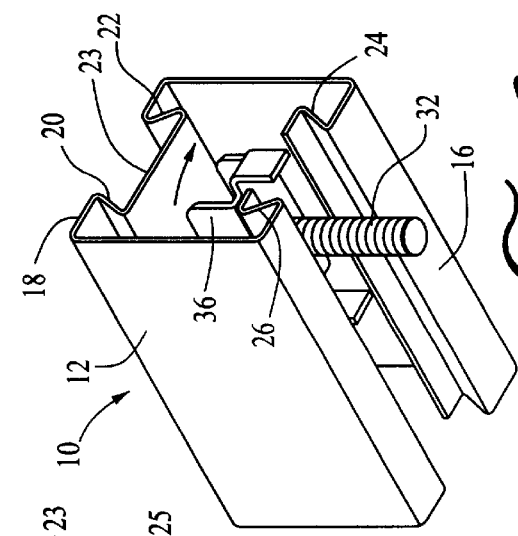
FIGS. 6A, 6B and 6C are perspective views taken at line 6—6 in FIG. 5, showing components of the gripping assembly of the invention during assembly, assembled, and secured relative to a second structural member.
Figure 6A:
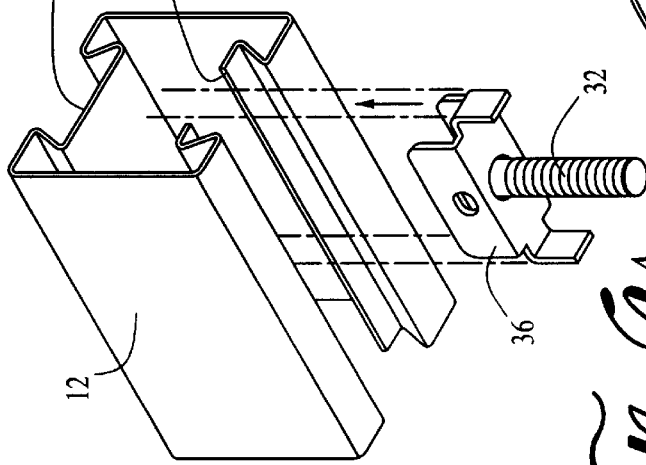
Figure 6C:
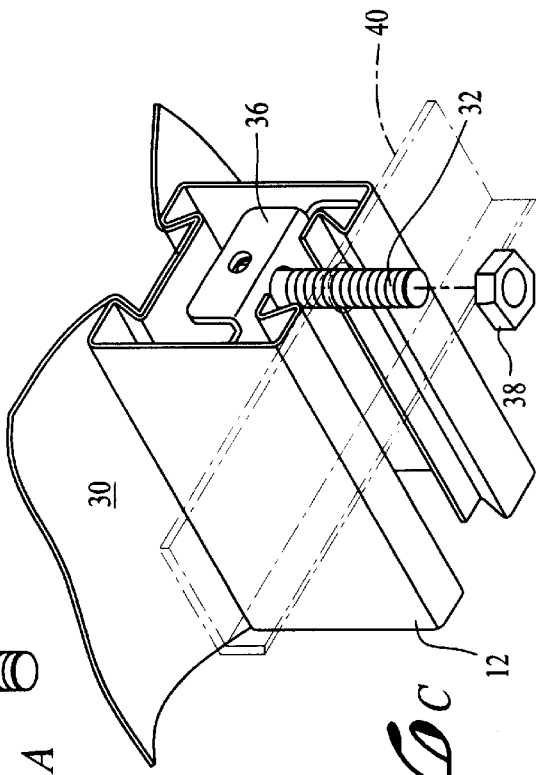

A threaded fastener 32, typically a bolt, as shown in FIGS. 6A and 6B, is extensible through the elongate slot 25 and is retained relative to wall portions 24 and 26 by extension of its generally channel-shaped head portion 36. The head 36 extends across the slot 25, as best shown in FIG. 6C to retain the head portion when the bolt is secured by a nut 38 to secure a second structural member 40, in the manner indicated in FIG. 6C.

The sheet gripping assembly may thus be secured by the threaded fastener 32 and the nut to any of a variety of structural members or other components in a structural assembly, such as that of a building structure or greenhouse.

The sheet material 30 secured by the sheet gripping assembly of the invention may be any appropriate sheet plastic, fabric or other sheet material. A preferred material for use with the apparatus of the invention is a polyester sheet material of very tight weave, which provides good gripping quality and other advantages.

Figure 3:
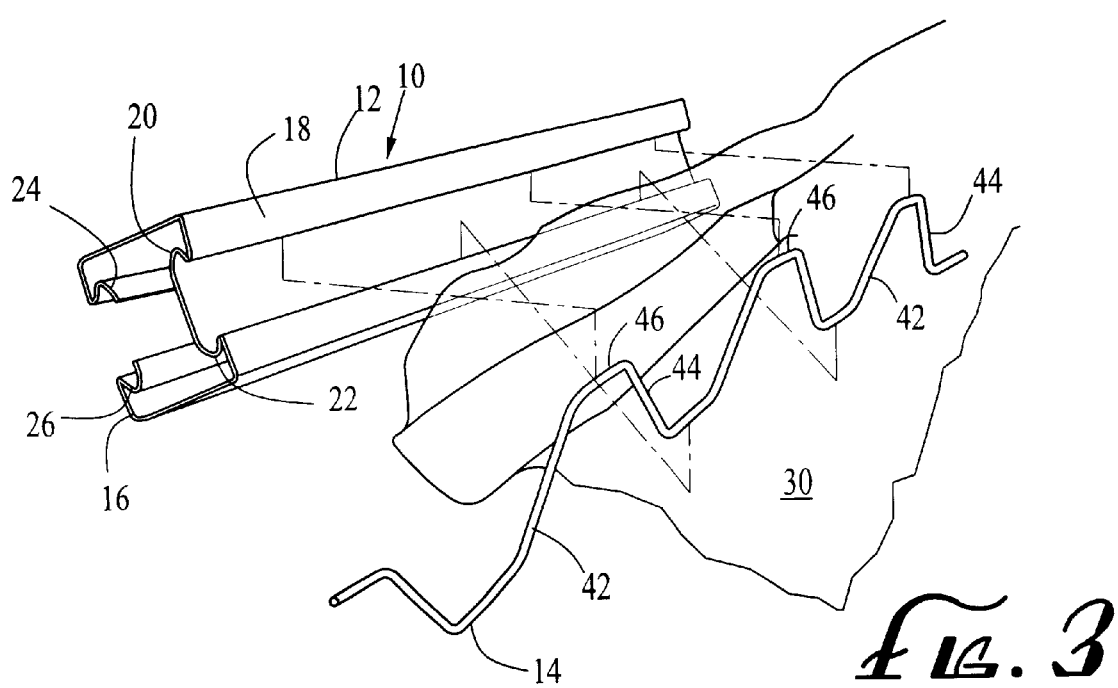
FIG. 3 is an exploded perspective view of components of the assembly of FIG. 1.

The gripping member 14, as shown in FIGS. 1 and 3, is of a generally zigzag configuration and has a plurality of zigs 42 joined by short straight portions 46 with zags 44. Each zig and each zag is a straight portion of a zigzag course, and each zig is at an angle to an adjacent zag.

The gripping member 14 is preferably fabricated of steel or an appropriate plastic material. The gripping member must be sufficiently resilient for manual deformation of portions thereof during engagement of respective zigzag portions therealong in the opposite channels defined in a side of the elongate member 12. The opposed channels are defined by inclined wall portions 24, 26 of side 16 or the inclined wall portions 20, 22 of side 18 of the structural member 12.

Figure 4:
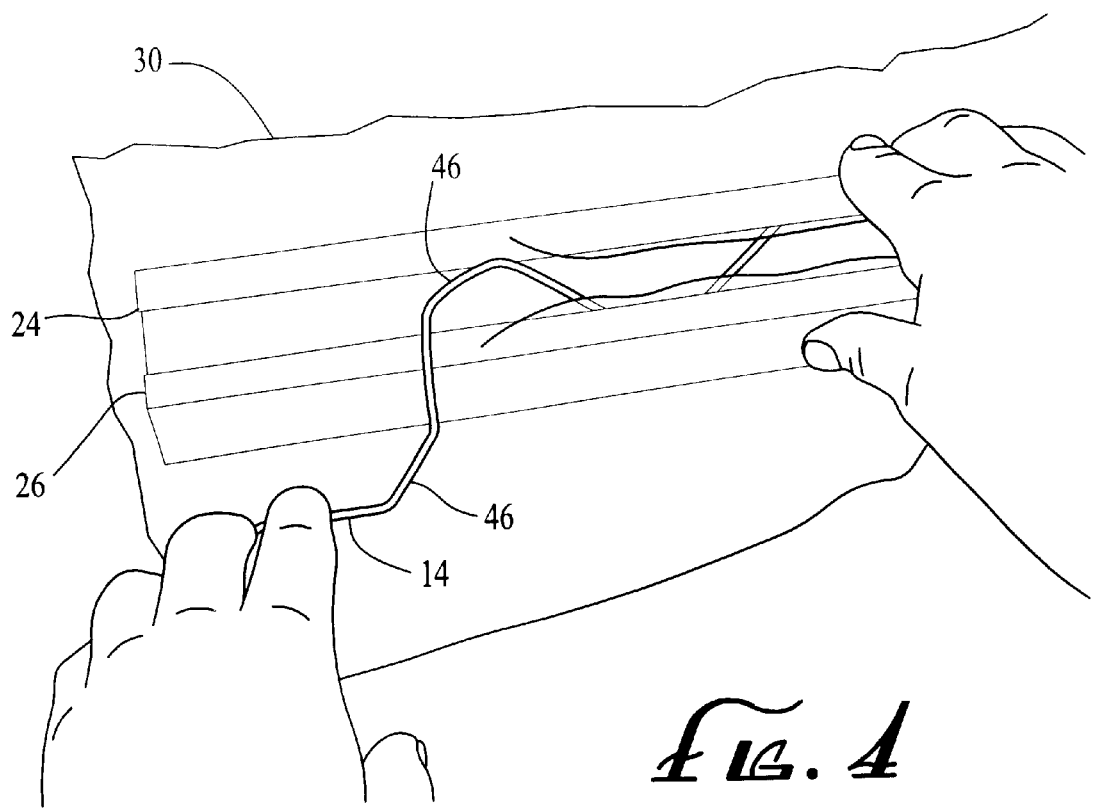
FIG. 4 is a perspective view illustrating manual manipulation of the gripping member of the invention during installation in said structural member.
Figure 5:
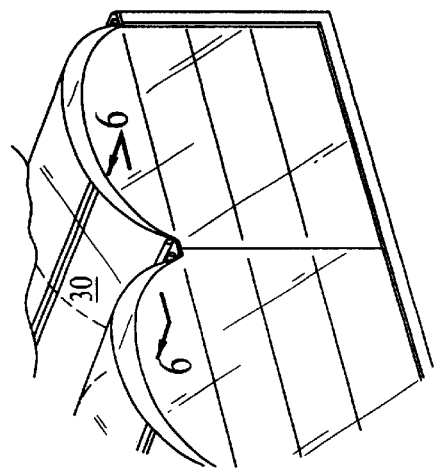
FIG. 5 is a perspective view of a portion of a greenhouse wherein the gripping assembly of the invention is utilized.

Referring to FIG. 4, the gripping member 14 is manually manipulable to secure the sheet material in the opposed channels. The sheet material 30 is first installed at the inner surfaces of inclined channel wall portions 24, 26 (FIG. 6B), for example. The gripping member 14 is then manually manipulated to deform or bend successive portions of the zigzag member into engagement in the opposite channels, as indicated in FIG. 4. The sheet material is thus gripped and secured by the gripping member by resilient gripping force, and is prevented from disengaging from the channel.

It will be understood that various changes and modifications may be made from the preferred embodiments discussed above without departing from the scope of the present invention, which is established by the following claims and equivalents thereof.

What is claimed is:

1. A sheet gripping assembly comprising:

an elongate member having opposite sides, said opposite sides of the elongate member defining confronting channels having inner walls joined to define a web therebetween, a gripping member of generally zigzag configuration and adapted to engage in said confronting channels of the elongate member to secure a sheet material in said confronting channels, said gripping member being resilient for manual manipulation and deformation of portions thereof for insertion into said opposite channels to secure the sheet material by spring compression, fastener means adapted to slidably engage in said slot, and means engaging said fastener means to secure the elongate member to a structural member.

2. An assembly according to claim 1, wherein said confronting channels are of generally acute angle configurations.

3. An assembly according to claim 1, wherein said elongate member is a structural member of a greenhouse structure.

4. An assembly according to claim 1, wherein each of said opposite sides of the elongate member define said confronting channels.

5. An assembly according to claim 1, wherein said channel walls are joined by rounded portions adapted to receive said zigzag gripping member.

6. An assembly according to claim 1, wherein inner walls of said channels are joined to define a web therebetween.

7. A sheet gripping assembly comprising:

an elongate structural member having opposite sides, at least one of said sides defining inwardly extending oppositely inclined wall portions defining confronting channels, a gripping member of generally zigzag configuration and adapted to engage in said confronting channels of the elongate member to secure a sheet material in said confronting channels, at least one of said confronting channels defining an elongate slot extending therebetween and along said elongate member and at least one having edge portion of said confronting channel wall, inner wall portions connected with said oppositely inclined wall portions of at least one of said elongate member sides defining an elongate slot extending along said elongate member, a threaded fastener having a head portion adapted for sliding engagement in said slot, and a threaded nut engaging said threaded fastener for securement of the elongate member with a second structural member.

8. An assembly according to claim 7, wherein said gripping member comprises a plurality of zigzag portions sufficiently resilient and adapted for manual manipulation and deformation of successive zigzag portions therealong for insertion of said portions into said opposite channels to secure the sheet material by spring compression.

9. An assembly according to claim 7, wherein said confronting channels are disposed in generally acute relation.

10. An assembly according to claim 7, wherein said elongate member is a structural member of a greenhouse structure.

11. An assembly according to claim 7, wherein said opposite sides of the elongate member defines said confronting channels.

12. An assembly according to claim 7, wherein inner walls of said channels are joined to define a web therebetween.

13. An assembly according to claim 7, wherein said channel walls are joined by rounded portions adapted to receive said zigzag gripping member.

* * * * *